United States Patent
Kang

[11] Patent Number: 5,898,010
[45] Date of Patent: Apr. 27, 1999

[54] RED BRICK AND METHOD FOR MANUFACTURING THE SAME

[76] Inventor: Chang-woo Kang, 10-1306 Hanjoo-lucky Apt., Jooyak-dong, Jinjoo-city, Kyungsangnam-do, Rep. of Korea

[21] Appl. No.: 08/778,898

[22] Filed: Jan. 3, 1997

[30] Foreign Application Priority Data

Jul. 26, 1996 [KR] Rep. of Korea ............... 96-30695

[51] Int. Cl.$^6$ ............... C04B 33/04; C04B 18/04; C04B 18/08; C04B 35/00
[52] U.S. Cl. ............... 501/155; 501/141; 501/127; 501/130; 501/131; 588/252; 588/9; 588/256; 588/901; 264/319; 264/328.1; 264/328.2; 264/328.14
[58] Field of Search ............... 501/141, 155, 501/127, 128, 129, 130, 131; 264/328.1, 328.2, 328.14, 319; 588/9, 252, 256, 901

[56] References Cited

U.S. PATENT DOCUMENTS

| | | | |
|---|---|---|---|
| 3,963,506 | 6/1976 | Shutt et al. | 501/131 |
| 4,130,439 | 12/1978 | Gashenko et al. | 501/155 |
| 4,911,757 | 3/1990 | Lynn et al. | 501/155 |
| 5,278,111 | 1/1994 | Frame | 501/155 |

OTHER PUBLICATIONS

Chemical abstract 85:50983, Nakagawa, 'Refractory brick from heavy metal containing waste', corresponds to JP 51050921, May 1976.

Chemical abstract 126:64013, Dominguez et al., Ecological bricks made with clays and steel dust pollutants, 1996, (no month).

*Primary Examiner*—Michael Marcheschi
*Attorney, Agent, or Firm*—Dvorak & Orum

[57] ABSTRACT

A red brick comprising waste foundry sand of 30~50 wt %, dusts of 5~10 wt %, and a remainder of clay. The waste foundry sand and dusts can be efficiently recycled, and the quantity of the sand used, the supply of which sand which is nearly exhausted, can be reduced. The heating temperature in the red brick manufacturing process is remarkably lowered, and the economical efficiency of the manufacturing process is improved greatly by using iron oxide included in dusts, instead of a chemical compound to obtain desired color.

3 Claims, No Drawings

RED BRICK AND METHOD FOR MANUFACTURING THE SAME

BACKGROUND OF THE INVENTION

The present invention relates to a red brick and a method for manufacturing the same, and more particularly, to a red brick formed primarily of waste foundry sand discharged from a foundry and dusts discharged from a steel factory, and to a method for manufacturing the same.

The main ingredients of a red brick are clay and sand. The sand is used for preventing contraction and cracks of the bricks and maintaining the strength of the same. However, efforts to reduce the quantity of sand used for manufacturing the red bricks or to search for a substitute for the sand are necessary since sand is in continuously increasing in demand and the supply is being exhausted.

The waste foundry sand is about 9~10 in a pH level and contains $SiO_2$ (about 97%) as a main component and $Al_2O_3$ and $Fe_2O_3$, etc, as other small amount components. However, the waste foundry sand contains materials such as Pb, Cu, Cd, As and Cr, etc, which are undesirable or harmful components. It is not easy to eliminate those harmful components. Also, if elimination cost of the undesirable components of the waste foundry sand exceeds a certain level, the economical efficiency of manufacturing industries which use the waste foundry sand is considerably lowered.

At present, most waste foundry sand is disposed of by being buried, which causes a serious shortage in burial land. Specific waste foundry sand containing harmful components such as Pb and Cu, etc, must be disposed under the relevant waste disposal laws in order to prevent an environmental pollution caused by heavy metals. Otherwise, general waste foundry sand which does not include the heavy metals must be recycled without being buried. However, there is no desirable way for utilizing the general waste foundry sand.

Also, one of the industrial wastes discharged in large quantities is the dusts discharged from a steel factory. The main components of these dusts are Fe, C, and limestone, etc. The recycling rate of these dusts is very low at present, and it is difficult to secure burial land as in the case of waste foundry sand. Research study into an application method of recycled products which can be manufactured at a low cost without causing environmental pollution is keenly necessary due to a secondarily caused pollution and excessive processing costs, even though the dusts are recycled.

Meanwhile, in conventional processing for manufacturing red brick, a heating temperature should be raised up to 1300° C. In this case, the economical efficiency of the manufacturing processing is very poor since about 13 hours at that temperature are needed and about 240 liters of fuel oil is consumed to raise that temperature, and about 25 hours are needed to cool the bricks. A reduction process is generally performed in order to make the bricks exhibit a desirable color. Since installation for the reduction process is very complicated and the costs for manufacturing the red bricks are very high, the economical efficiency of the red brick manufacturing industry is very poor.

SUMMARY OF THE INVENTION

It is an object of the present invention to provide a method for recycling waste foundry sand and dusts, in particular, to provide a red brick using the waste materials and a method for manufacturing the same.

To achieve the above object, the red brick according to the present invention includes dusts of 5–10 wt %, waste foundry sand of 30–50 wt %, and leftover clay.

The dusts mainly discharged from a steel factory have very minute particles, and thus have a very large surface area. Since the main component of the dusts is iron oxide, which turns red when heated after being mixed with other materials, it is possible to greatly reduce the quantity of chemical compounds used for making the brick red by employing the iron oxide during a red brick manufacturing process.

In case the dusts comprise less than 5 wt % with respect to the entire weight of the red brick to be manufactured, it is difficult to keep a desirable color of the red brick. Also, dusts exceeding 10 wt % are not desirable, in view of the coloring of the red brick and disposal of the dusts.

The waste foundry sand used as a substitute for the sand for manufacturing brick can manufacture excellent red bricks since the particles thereof are far more minute and uniformer than those of the sand. However, in case the waste foundry sand comprises less than 30 wt % with respect to the entire weight of the red brick, a substitution effect for the sand is insufficient. In case the waste foundry sand comprises more than 50 wt % with respect to the entire weight of the red brick, a desired compressive strength will not be obtained.

To achieve the above object, there is provided a method for manufacturing a red brick of the present invention.

In the method for manufacturing the red brick of the present invention, the quantity of water used is the same as that in a conventional red brick manufacturing method.

At least one binding agent selected from the group consisting of tar, pitch, phenolic resin, and furan resin is preferably added to the paste.

The heating process is preferably performed for 10 to 12 hours at a temperature of 970° C. to 1000° C.

According to the manufacturing method of the present invention, the heating is performed at a temperature of 970° C. to 1000° C., which is far lower than the conventional heating temperature of about 1300° C. without necessity for maintaining a reduction atmosphere. However, the red brick manufactured according to the present invention has a color as desirable as one manufactured in a process using a reduction atmosphere. Therefore, it is possible to greatly reduce the manufacturing cost of the red brick. Also, the heavy metals included in the waste foundry sand as well as the dusts, exist in extremely small quantities and are hardly detectible in the finally manufactured red brick due to a purification effect by absorption power of clay during the mixing with the clay, molding, drying and heating procedure and an oxidation during the heating procedure. Therefore, the present invention has a great industrial applicability in view of a very efficient recycling of industrial wastes.

DETAILED DESCRIPTION OF THE INVENTION

Hereinafter, the present invention will be described in detail with reference to examples. However, the present invention is not restricted to the following examples.

As a result of testing waste foundry sand and dusts used in the examples, the components existing in extremely small quantities are as follows.

| composition of dusts (mg/l) | |
| --- | --- |
| Pb and its compound | 9.32 |
| Cu and its compound | 0.628 |
| Hg and its compound | 0.0138 |
| Cd and its compound | 18.5 |

Arsenic, cromium compound, cyanic compound, organic phosphorus compound, tetrachloroethylene and trichloroethylene are undetectable.

| composition of waste foundry sand (mg/l) | |
| --- | --- |
| Pb and its compound | 0.078 |
| Cu and its compound | 0.164 |
| As and its compound | 0.043 |
| Hg and its compound | 0.0002 |
| Cd and its compound | 0.009 |
| Cromium compound | 0.015 |

Cyanic compound, organic phosphorus compound, tetrachloroethylene and trichloroethylene are undetectable.

EXAMPLE 1

After homogeneously mixing waste foundry sand of 4.5 kg and dusts of 0.5 kg containing the above small quantities of components with clay of 5 kg, water, small quantities of tar, pitch, phenolic resin and furan resin were added. After compression molding this compound paste, it was dried at a temperature of about 200° C. Then, it was heated by raising the temperature to about 980° C. About 10 hours were taken for drying and heating the paste. A uniform color of reddish brown was obtained over the entire red brick.

EXAMPLES 2 TO 4

A red brick was manufactured in the same method as that described in the example 1 except that the quantities of waste foundry sand, dusts and clay were controlled to be 3 kg, 0.8 kg and 6.2 kg in the example 2; 5 kg, 1 kg and 4 kg in the example 3; and 4 kg, 0.7 kg and 5.3 kg in the example 4, respectively. The color of the red brick manufactured in these examples was uniform throughout. However, the color of the red brick varied from reddish brown to dark reddish brown according to the quantities of the dusts.

Comparative Example 1

After manufacturing a brick using sand and clay according to the conventional method, the brick was processed by a chemical compound including iron oxide. After drying the processed brick, it was heated for about 12 hours at a temperature of 1300° C.

Comparative Examples 2 and 3

The red brick was manufactured in the same method as that described in the example 1 except that the quantities of waste foundry sand, dusts and clay were controlled to be 2 kg, 0.2 kg and 7.8 kg in the example 2 and 6 kg, 1.5 kg and 3.5 kg in the example 3. As a result, the manufactured red brick did not exhibit a desirable color and the heating was not desirably performed.

As a result of the evaluation test of the red brick manufactured according to the embodiment 1 of the present invention, the red brick manufactured according to the embodiment 1 of the present invention was proved to have an absorption rate of 5.6% and a compressive strength of $2567N/cm^2$. The standard requirements for a red brick are an absorption rate of less than 10% and a compressive strength of greater than $2056N/cm^2$. However, in view of adhesion strength, hardness and impact strength, it is preferable that the absorption rate is 5% to 7% and the compressive strength is greater than the above standard value, i.e., $2056N/cm^2$ and less than about $2800N/cm^2$. On the basis of the above criteria, the red brick made according to the present invention exhibited a very excellent quality.

Also, in tests for residual materials, Pb, Hg, Cd, Cu, Cr (VI), As, and cyanine were not detected.

In the red brick of the present invention and the method for manufacturing the same, the waste foundry sand and dusts can be efficiently recycled, and the amount of regular sand used, the supply of which is nearly exhausted, can be reduced. Also, the heating temperature in the red brick manufacturing process is remarkably lowered, and the economical efficiency of the manufacturing process is improved greatly by using iron oxide included in dusts, instead of a chemical compound.

What is claimed is:

1. A red brick comprising:

5–10 wt % steel manufacturing waste dusts;

30–50 wt % steel foundry waste sand; and the remainder clay.

2. A method for manufacturing a red brick, comprising the steps of:

mixing together 5–10 wt % steel manufacturing waste dusts, 30–50 wt % steel foundry waste sand and the remainder clay;

kneading the mixture with water to form a paste;

molding the paste; and drying and heating the molded paste.

3. The method for manufacturing a red brick according to claim 2, wherein said heating is performed at a temperature range of 970–1000° C. for 10–12 hours.

* * * * *